(12) United States Patent
Renault

(10) Patent No.: US 11,268,472 B2
(45) Date of Patent: Mar. 8, 2022

(54) METHANE SAFETY SYSTEMS FOR TRANSPORT REFRIGERATION UNITS

(71) Applicant: Carrier Corporation, Palm Beach Gardens, FL (US)

(72) Inventor: Loic Renault, Saint Etienne du Rouvray (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 256 days.

(21) Appl. No.: 16/487,318

(22) PCT Filed: Feb. 24, 2017

(86) PCT No.: PCT/IB2017/000309
§ 371 (c)(1),
(2) Date: Aug. 20, 2019

(87) PCT Pub. No.: WO2018/154347
PCT Pub. Date: Aug. 30, 2018

(65) Prior Publication Data
US 2020/0055375 A1 Feb. 20, 2020

(51) Int. Cl.
*F02D 41/22* (2006.01)
*B60H 1/32* (2006.01)
(Continued)

(52) U.S. Cl.
CPC ............ *F02D 41/22* (2013.01); *B60H 1/3225* (2013.01); *B60H 1/3232* (2013.01); *B60P 3/20* (2013.01);
(Continued)

(58) Field of Classification Search
CPC ...... F02D 41/22; F02D 19/023; F02D 19/025; F02D 29/06; F02D 2041/225;
(Continued)

(56) References Cited

U.S. PATENT DOCUMENTS

| 4,444,041 A | 4/1984 | Zison |
| 5,311,851 A | 5/1994 | Wright |

(Continued)

FOREIGN PATENT DOCUMENTS

| CN | 201961215 U | 9/2011 |
| CN | 202378691 | 8/2012 |

(Continued)

OTHER PUBLICATIONS

European Office Action for European Application No. 17715779.9, dated Feb. 9, 2021, 8 pages.

(Continued)

*Primary Examiner* — Sizo B Vilakazi
(74) *Attorney, Agent, or Firm* — Cantor Colburn LLP

(57) ABSTRACT

A system comprising a refrigeration engine (132) and regulator (250, 350, 450, 550, 650) positioned within a housing (144, 244), the regulator (250, 350, 450, 550, 650) controlling fuel to the engine through a fuel line (354), a lock-off valve connected to the regulator (250, 350, 450, 550, 650) to shut off fuel supply through the regulator (250, 350, 450, 550, 650), a controller operably connected to the lock-off valve and/or the regulator (250, 350, 450, 550, 650), a guide (462, 562) positioned within the housing (144, 244) and proximate to the refrigeration engine (132), the regulator (250, 350, 450, 550, 650), and/or the fuel line (354) to direct gases leaking from the refrigeration engine (132), regulator (250, 350, 450, 550, 650), and/or at least one fuel line (354), and a methane sensor (566, 666A) positioned within the guide (462, 562) to detect the presence of methane within the guide (462, 562) that is directed by the guide (462, 562), the methane sensor (566, 666A) in communication with the controller and configured to transmit a signal to the controller when methane is detected by the methane sensor (566, (Continued)

666A). The controller performs a safety action when the signal from the methane sensor (566, 666A) is received.

19 Claims, 7 Drawing Sheets

(51) Int. Cl.
*B60P 3/20* (2006.01)
*F02D 19/02* (2006.01)
*F02D 29/06* (2006.01)

(52) U.S. Cl.
CPC .......... *F02D 19/023* (2013.01); *F02D 19/025* (2013.01); *F02D 29/06* (2013.01); *F02D 2041/225* (2013.01)

(58) Field of Classification Search
CPC ........... F02D 2041/228; F02D 41/0027; B60H 1/3225; B60H 1/3232; B60P 3/20; Y02T 10/40; Y02T 10/30; F25B 2327/001; F25B 27/00; F25B 49/005
See application file for complete search history.

(56) References Cited

U.S. PATENT DOCUMENTS

| | | | |
|---|---|---|---|
| 5,501,200 A | 3/1996 | Ogartz | |
| 5,592,387 A | 1/1997 | Shelef et al. | |
| 5,611,316 A | 3/1997 | Oshima et al. | |
| 6,178,927 B1 | 1/2001 | Rieck et al. | |
| 9,879,871 B2* | 1/2018 | Goel | F24F 11/30 |
| 10,113,783 B2* | 10/2018 | Takagi | F25B 1/04 |
| 10,422,548 B2* | 9/2019 | Tomita | F25B 49/005 |
| 10,596,881 B2* | 3/2020 | Swab | F25D 11/003 |
| 10,677,679 B2* | 6/2020 | Gupte | G01M 3/40 |
| 10,935,454 B2* | 3/2021 | Kester | G01M 3/40 |
| 10,996,131 B2* | 5/2021 | McQuade | G01M 3/16 |
| 2004/0121718 A1 | 6/2004 | Grochowski | |
| 2013/0213068 A1* | 8/2013 | Goel | F25B 49/005 62/129 |
| 2014/0090729 A1 | 4/2014 | Coulter et al. | |
| 2014/0365100 A1 | 12/2014 | Speier | |
| 2016/0334146 A1 | 11/2016 | Swab | |
| 2018/0037091 A1* | 2/2018 | Swab | F25B 25/005 |

FOREIGN PATENT DOCUMENTS

| | | |
|---|---|---|
| CN | 102944449 A | 2/2013 |
| CN | 202735331 | 2/2013 |
| CN | 103967633 | 8/2014 |
| CN | 203809134 | 9/2014 |
| CN | 104833611 A | 8/2015 |
| EP | 2631570 A2 | 8/2013 |
| JP | S62285032 | 12/1987 |
| JP | H05052720 A | 3/1993 |
| JP | 2006090891 A | 4/2006 |
| JP | 2015200525 A | 11/2015 |
| WO | 2015029094 A1 | 3/2015 |
| WO | 2016130537 A1 | 8/2016 |

OTHER PUBLICATIONS

FleetOwner "Methane gas detector for natural gas vehicle users", Mar. 8, 2012; 3 pages.
International Search Report, International Application No. PCT/IB2017/000309, dated Oct. 16, 2017, International Search Report 6 pages.
International Written Opinion, International Application No. PCT/IB2017/000309, dated Oct. 16, 2017, International Written Opinion 8 pages.

* cited by examiner

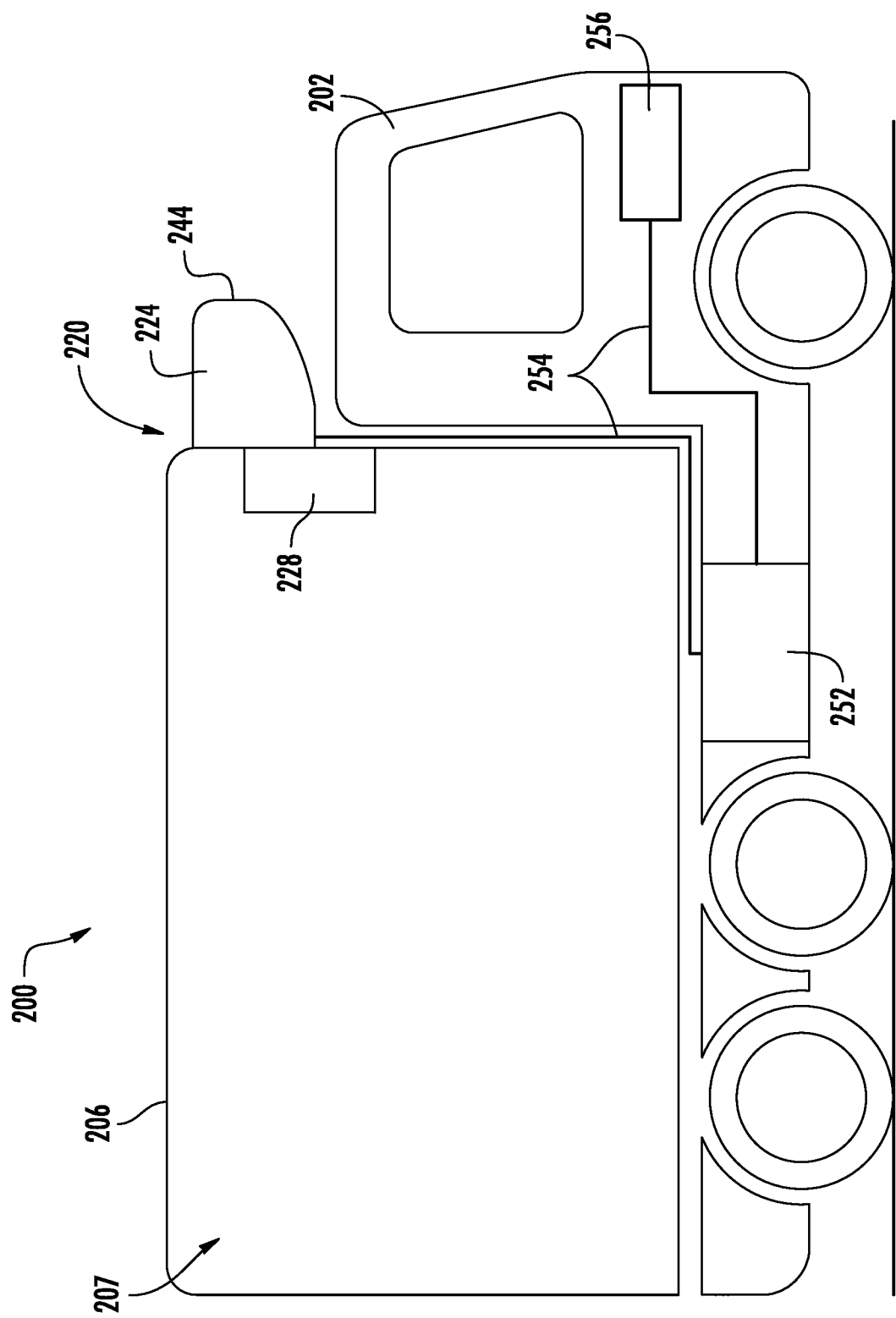

METHANE SAFETY SYSTEMS FOR TRANSPORT REFRIGERATION UNITS

CROSS REFERENCE TO RELATED APPLICATIONS

This is a U.S. National Stage of Application No. PCT/IB2017/000309, filed on Feb. 24, 2017, the disclosure of which is incorporated herein by reference.

BACKGROUND

The subject matter disclosed herein generally relates to refrigeration systems for transport refrigeration units (e.g., trucks, containers, etc.) and, more particularly, to safety systems for refrigeration units used in transport having methane engines.

Transport refrigeration units can be included and/or incorporated with cargo/shipping containers, trailers, trucks, light commercial vehicles, etc. to provide refrigeration of a space of the vehicle or structure. The refrigeration units can be positioned to cool a recirculating airflow within a compartment or cargo space of the vehicle or structure. Depending upon the implementation, refrigeration equipment may be mounted to an exterior of the container, within a subcompartment in the container, or a combination thereof, e.g., with some components within the compartment and other components mounted to an exterior of the vehicle or structure.

The refrigeration equipment can include an engine to provide power to a refrigeration unit and/or components thereof. It may be advantageous to monitor aspects of the refrigeration unit and specifically the engine and components associated therewith.

SUMMARY

According to embodiments, safety systems for methane-powered refrigeration units are provided. The safety systems include a housing, a refrigeration engine positioned within the housing, a regulator positioned within the housing and fluidly connected to the engine, the regulator configured to control fuel supply to the refrigeration engine through at least one fuel line, a lock-off valve operably connected to the regulator and configured to shut off fuel supply through the regulator to the refrigeration engine, a safety controller operably connected to at least one of the lock-off valve and the regulator, a guide positioned within the housing and proximate to at least one of the refrigeration engine, the regulator, and the at least one fuel line, the guide arranged to direct gases leaking from the respective refrigeration engine, regulator, and at least one fuel line, and a methane sensor positioned within the guide and configured to detect the presence of methane within the guide that is directed by the guide, the methane sensor in communication with the safety controller and configured to transmit a signal to the safety controller when methane is detected by the methane sensor. The safety controller performs a safety action when the signal from the methane sensor is received.

In addition to one or more of the features described herein, or as an alternative, further embodiments of the safety system may include that the housing includes a cover and the guide is one of removably attached or fixedly attached to the cover, wherein the guide covers the.

In addition to one or more of the features described herein, or as an alternative, further embodiments of the safety system may include that the guide is positioned proximate to at least two of the refrigeration engine, the regulator, and the at least one fuel line.

In addition to one or more of the features described herein, or as an alternative, further embodiments of the safety system may include that the guide is positioned proximate all of the refrigeration engine, the regulator, and the at least one fuel line, such that a leak from any of the refrigeration engine, the regulator, and the at least one fuel line is directed to the methane sensor.

In addition to one or more of the features described herein, or as an alternative, further embodiments of the safety system may include that the guide is a funnel and the methane sensor is positioned at a peak or top of the funnel.

In addition to one or more of the features described herein, or as an alternative, further embodiments of the safety system may include that the safety action includes activating the lock-off valve to shut of a fuel supply to at least one of the refrigeration engine, the regulator, and the at least one fuel line.

In addition to one or more of the features described herein, or as an alternative, further embodiments of the safety system may include that the safety action includes generating a notification to notify a person of a methane leak.

In addition to one or more of the features described herein, or as an alternative, further embodiments of the safety system may include that the methane sensor includes a sensor layer made of an inorganic compound that has lower conductivity in the absence of methane and a higher conductivity in the presence of methane.

In addition to one or more of the features described herein, or as an alternative, further embodiments of the safety system may include that the sensor layer is a layer of tin dioxide.

In addition to one or more of the features described herein, or as an alternative, further embodiments of the safety system may include that the methane sensor has a sensitivity to methane levels in concentrations from 200 to 10,000 ppm within the guide.

In addition to one or more of the features described herein, or as an alternative, further embodiments of the safety system may include that the refrigeration unit further includes a compressor and a condenser.

In addition to one or more of the features described herein, or as an alternative, further embodiments of the safety system may include that the guide is formed of sheet metal.

In addition to one or more of the features described herein, or as an alternative, further embodiments of the safety system may include that the guide is positioned proximate the at least one fuel line, the guide having the methane sensor installed therein, the system further including a second guide positioned within the housing and proximate to the refrigeration engine, the second guide arranged to direct gases leaking from the refrigeration engine, a second methane sensor positioned within the second guide and in communication with the safety controller, a third guide positioned within the housing and proximate to the regulator, the third guide arranged to direct gases leaking from the regulator, and a third methane sensor positioned within the third guide and in communication with the safety controller.

According to some embodiments, transportation refrigeration units including the safety systems of any of the embodiments described herein are provided.

According to some embodiments, container refrigeration units including the safety systems of any of the embodiments described herein are provided.

Technical effects of embodiments of the present disclosure include safety systems for refrigeration units having methane engines. Further technical effects include at least one guide positioned within a housing of a refrigeration unit that is configured to direct methane gas to a methane sensor such that a methane leak within the refrigeration unit can be detected and a safety action can be performed.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

FIG. 2A is a schematic illustration of a transport vehicle having a refrigeration unit that can employ embodiments of the present disclosure;

DETAILED DESCRIPTION

Figure 1A:
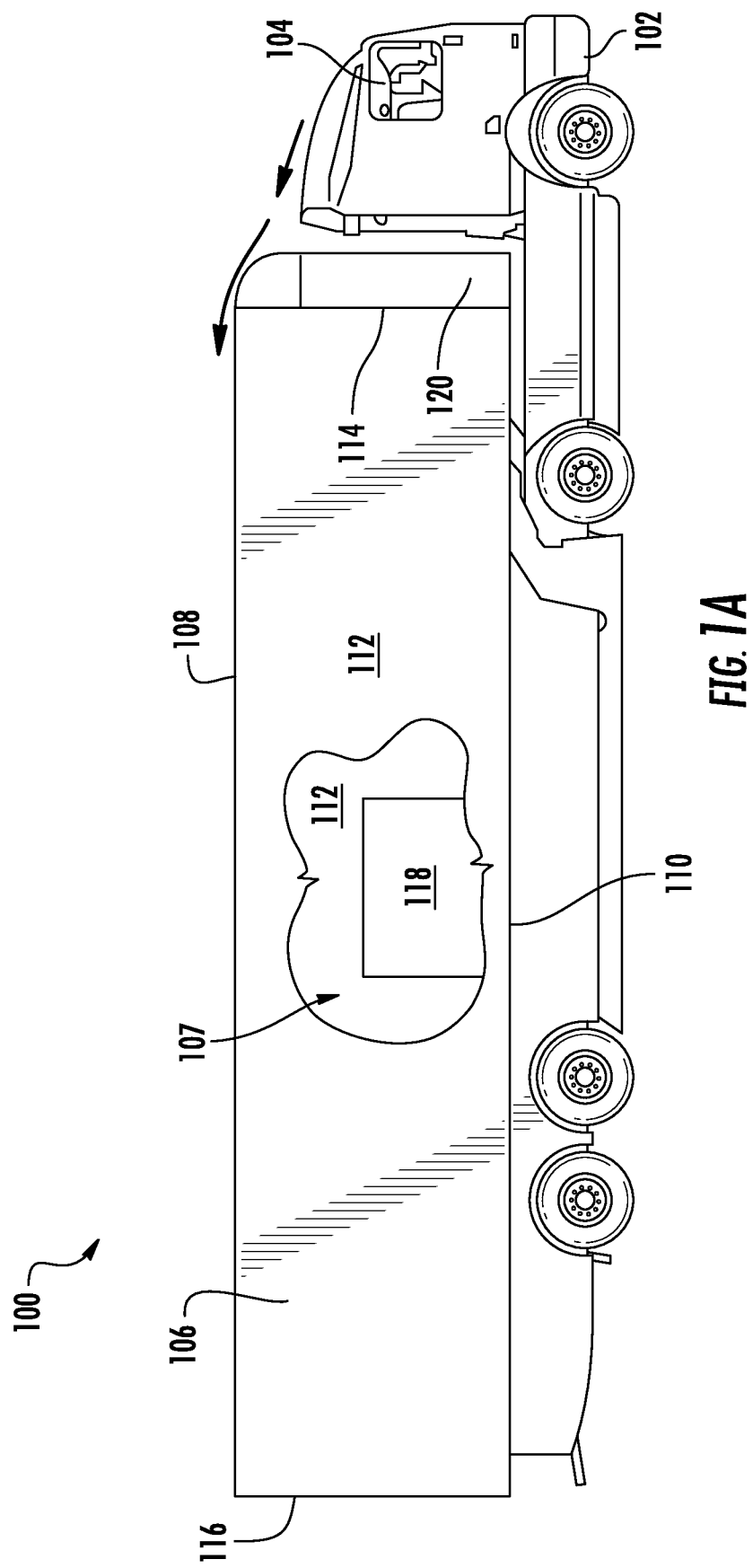
FIG. 1A is a schematic illustration of an embodiment of a container transportation system having a cargo compartment and a refrigeration unit that can employ embodiments of the present disclosure.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

Shown in FIG. 1A is a schematic of an embodiment of a container transportation system 100. The container transportation system 100 includes a tractor 102 including an operator's compartment or cab 104 and also including an engine, which acts as the drive system of the container transportation system 100. A container 106 is coupled to the tractor 102. The container 106 is a refrigerated container 106 and includes a top wall 108, a directly opposed bottom wall 110, opposed side walls 112, and a front wall 114, with the front wall 114 being closest to the tractor 102. The container 106 further includes a door or doors (not shown) at a rear wall 116, opposite the front wall 114. The walls of the container 106 define a cargo compartment or cargo space 107. The container 106 is configured to maintain a cargo 118 located inside the cargo compartment at a selected temperature through the use of a refrigeration unit 120 located on or next to the container 106. The refrigeration unit 120, as shown in FIG. 1A, is located at or attached to the front wall 114.

Figure 1B:
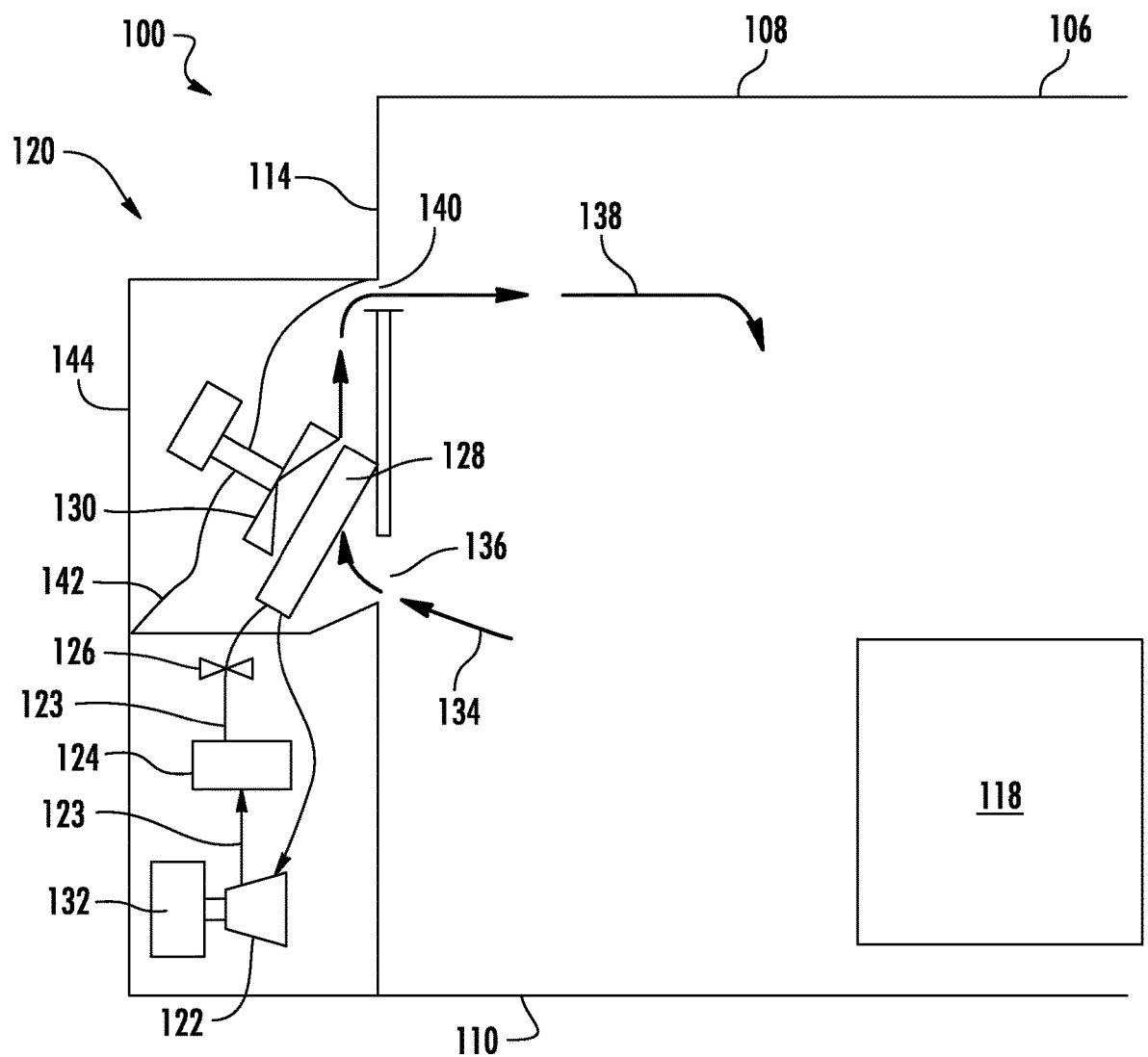
FIG. 1B is a schematic illustration of the refrigeration unit of FIG. 1A.

Referring now to FIG. 1B, the refrigeration unit 120 is shown in more detail. The refrigeration unit 120 includes a compressor 122, a condenser 124, an expansion valve 126, an evaporator 128, and an evaporator fan 130. The compressor 122 is operably connected to a refrigeration engine 132 which drives the compressor 122. The refrigeration engine 132 is connected to the compressor in one of several ways, such as a direct shaft drive, a belt drive, one or more clutches, and/or via an electrical generator. A refrigerant line 123 fluidly connects the components of the refrigeration unit 120.

Airflow is circulated into and through the cargo compartment of the container 106 by means of the refrigeration unit 120. A return airflow 134 flows into the refrigeration unit 120 from the cargo compartment of the container 106 through a refrigeration unit inlet 136, and across the evaporator 128 via the evaporator fan 130, thus cooling the return airflow 134 to a selected or predetermined temperature. The cooled return airflow 134, now referred to as supply airflow 138, is supplied into the cargo compartment of the container 106 through a refrigeration unit outlet 140, which in some embodiments is located near the top wall 108 of the container 106. The supply airflow 138 cools the cargo 118 in the cargo compartment of the container 106. It is to be appreciated that the refrigeration unit 120 can further be operated in reverse to warm the container 106 when, for example, the outside temperature is very low.

The refrigeration unit 120 is positioned in a frame 142 and contained in an accessible housing 144, with the frame 142 and/or the housing 144 secured to an exterior side of the front wall 114 such that the refrigeration unit 120 is positioned between the front wall 114 and the tractor 102, as shown in FIG. 1A.

It will be appreciated by those of skill in the art that the systems and configurations of FIGS. 1A and 1B are merely examples and are provided for illustrative and descriptive purposes only. The disclosure is not limited thereby. For example, although a tractor-trailer configuration is shown, systems may be employed in other trailer configurations, in various truck configurations, and/or in other systems and configurations employing refrigeration units and/or systems, transportation or otherwise.

Figure 2B:
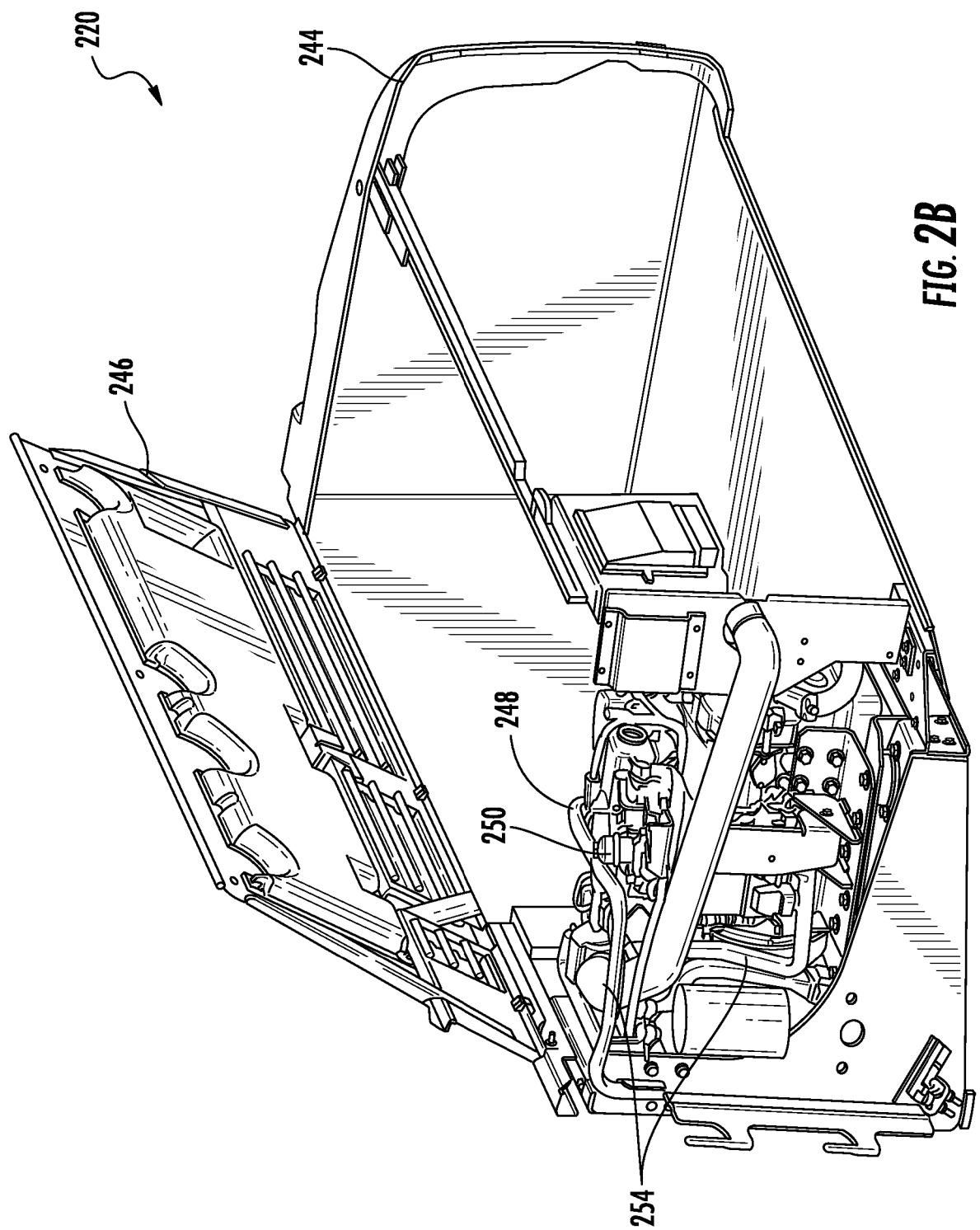
FIG. 2B is a schematic illustration of the refrigeration unit of FIG. 2A.

Turning now to FIGS. 2A-2B, a transport refrigeration vehicle 200 having a refrigeration unit 220 is shown. As shown in FIG. 2A, the transport refrigeration vehicle 200 includes a tractor 202 and a container 206. The container 206 defines a cargo space 207 therein and at one end of the container 206 is a refrigeration unit 220. The refrigeration unit 220, as shown, includes a condenser 224 and an evaporator 228. The refrigeration unit 220 includes other components that are not shown for simplicity. Various components of refrigeration unit 220 are housed within a housing 244, such as the condenser 224 and other components including, but not limited to, an engine, a regulator, control components, valves, etc., as will be appreciated by those of skill in the art.

As shown in FIG. 2B, an enlarged schematic illustration of a portion of the refrigeration unit 220 of FIG. 2A is provided. The refrigeration unit 220 includes the housing 244 with various components of the refrigeration unit 220 housed therein. The housing 244 includes a cover 246, which can be designed to protect the various components within the housing 244 and also provide noise dampening associated with operation of the refrigeration unit 220. As shown, the housing 244 houses, at least, a refrigeration-unit engine 248 and a regulator 250 that is configured to regulate fuel supplied to the refrigeration-unit engine 248.

The refrigeration-unit engine 248 of the refrigeration unit 220 can receive fuel from a fuel supply tank 252 located remotely from the refrigeration unit 220. For example, as shown in FIG. 2A, the fuel supply tank 252 is located below the container 206. The fuel supply tank 252 is fluidly connected to the refrigeration unit 220 by one or more fuel lines 254. Additional fuel lines 254 can fluidly connect the fuel supply tank 252 to a vehicle engine 256 of the tractor 202. As will be appreciated by those of skill in the art, the fuel supply tank 252 and/or the fuel lines 254 can include valves, regulators, filters, meters, sensors, controllers etc. to control and/or regulate fuel supply from the fuel supply tank 252 to the refrigeration-unit engine 248.

As noted above, the refrigeration unit 220 includes a regulator 250 within the housing 244. The regulator 250 is configured and/or controlled to supply fuel from the fuel supply tank 252 to the refrigeration-unit engine 248.

In some configurations, the refrigeration unit 220, and the refrigeration-unit engine 248 thereof, can be supplied with natural gas as a fuel. For example, the refrigeration-unit engine 248 may operate using compressed natural gas (from the fuel supply tank 525). Such natural gas may be composed of 90-95% methane ($CH_4$). As will be appreciated by those of skill in the art, methane has a flammability range of 5-15 percent volume concentration in air. Such percent volume concentration has a much higher flammability range than diesel fuel (e.g., an alternative refrigeration-unit engine configuration) which has a flammability range of 0.6-5.5 percent. Five percent (i.e., 50,000 parts per million [ppm]) of natural gas is the lower flammable limit (LFL), and below 5 percent concentration, a mixture of natural gas and air is too lean to sustain a flame, and thus combustion for operation of the refrigeration-unit engine. Further, fifteen percent (i.e., 150,000 ppm) is the upper flammable limit (UFL) and above 15 percent concentration, a mixture of natural gas and air is too rich to sustain a flame. To ensure the proper fuel mixture is provided, a mixer or other component can be housed within the housing 244. Further, as will be appreciated by those of skill in the art, and as schematically shown in FIG. 2B, the refrigeration-unit engine 248 and other components within the housing 244 are fluidly connected by pipes, tubes, hoses, etc. (collectively, fuel lines 254), which can include seals, connectors, valves, fittings, etc. (incorporated herein into the fuel lines 254).

Damage and/or wear to the fuel lines 254, particularly within the housing 244 can potentially lead to fuel leaks, and in the case of natural gas, methane leaks. Such damage and/or wear can include, but is not limited to, a cracked hose, a damaged seal, or a damaged fitting of the fuel lines 254.

In case of a methane leak, the flammability range can possibly be reached inside a unit encapsulated due to noise emissions optimization. Accordingly, embodiments provided herein are directed to refrigeration units configured to detect and alert if a methane (or other gas, such as a different fuel) leak occurs within the housing of the refrigeration unit.

Figure 3:
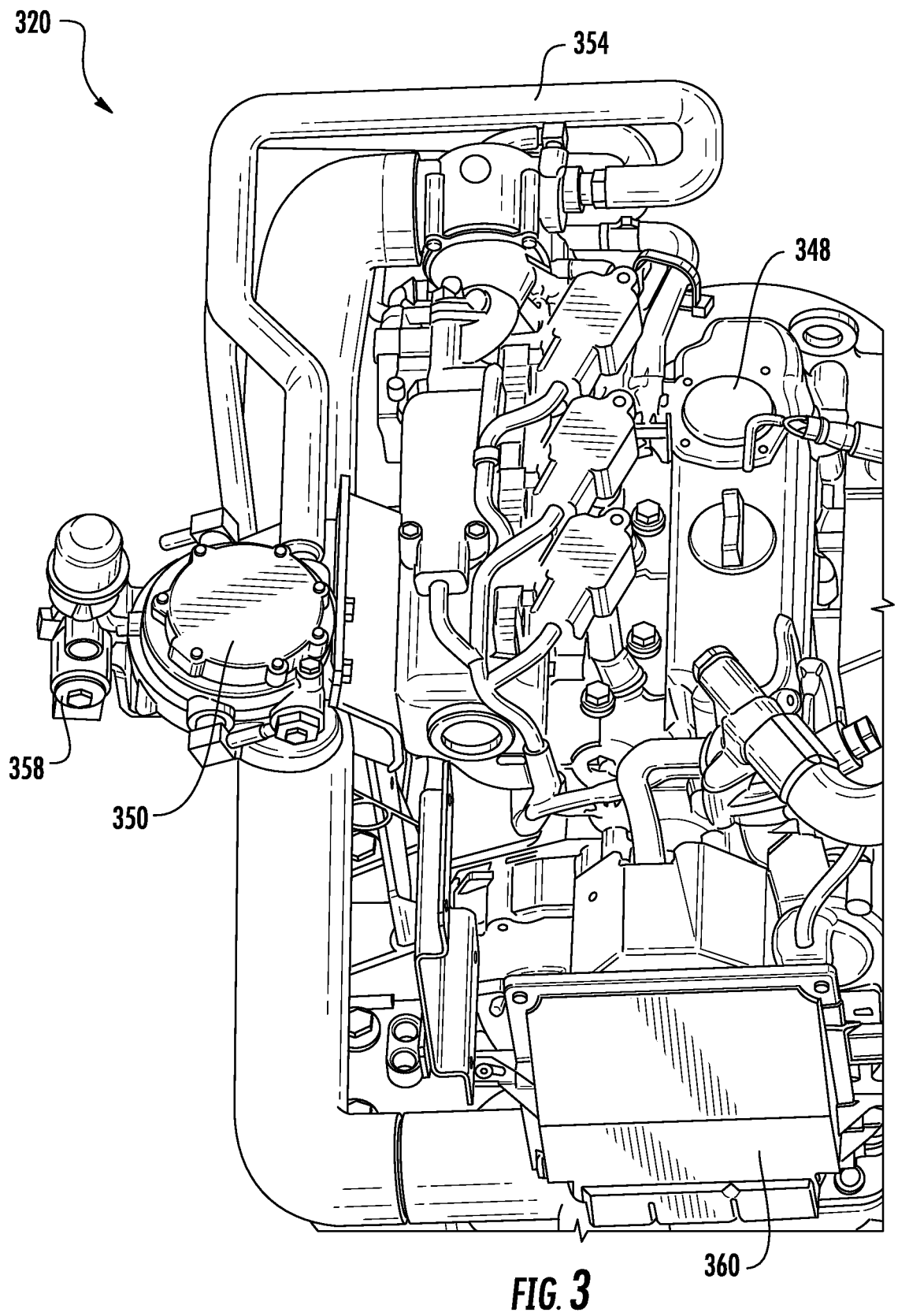
FIG. 3 is a detailed illustration of a portion of a refrigeration unit that can employ embodiments of the present disclosure.

Turning now to FIG. 3, a detailed illustration of a portion of a refrigeration unit 320 is shown. The refrigeration unit 320 is shown without a housing, as described above, for clarity and simplicity. The refrigeration unit 320 includes a refrigeration-unit engine 348 that is provided with natural gas fuel through a fuel line 354 that is fluidly connected to a regulator 350 which regulates fuel from a fuel supply tank, as described above. The regulator 350 is equipped with a lock-off valve 358 which can be actuated to cut or stop fuel supply from the fuel supply tank to the regulator 350 and thus to the refrigeration-unit engine 348 (i.e., prevent further fuel from entering a housing).

The lock-off valve 358 can be operably controlled by a safety controller 360. The safety controller 360 can be operably connected to various sensors, gauges, and/or other monitoring devices or components that are housed within the refrigeration unit and/or associated therewith. For example, in accordance with a non-limiting embodiment of the present disclosure, the safety controller 360 can be operably connected to a gas detection sensor as described herein. The gas detection sensor is configured to detect the presence of one or more specific gases in proximity to the gas detection sensor, such as within the housing of the refrigeration unit and/or a portion thereof.

The safety controller 360 includes one or more processors, memory, and electrical components as will be appreciated by those of skill in the art. The safety controller 360, for example, can include various types of communication protocol components and/or elements to receive input from one or more sensors. The received inputs can then be processed by the safety controller 360 in order to determine if a threshold is exceeded or other criteria is met. Upon determining a criterion is met, the safety controller 360 can generate a notification or other signal that is used to address the particular criteria. For example, the safety controller 360 can monitor concentrations of a gas within the housing of the refrigeration unit, e.g., methane gas, and upon a detected concentration exceeding a predetermined threshold, the safety controller 360 can take reactive measures, including, but not limited to, activating/actuating the lock-off valve, generating a warning message (e.g., siren, buzzer, lighting, text message, etc.), etc.

Figure 4:
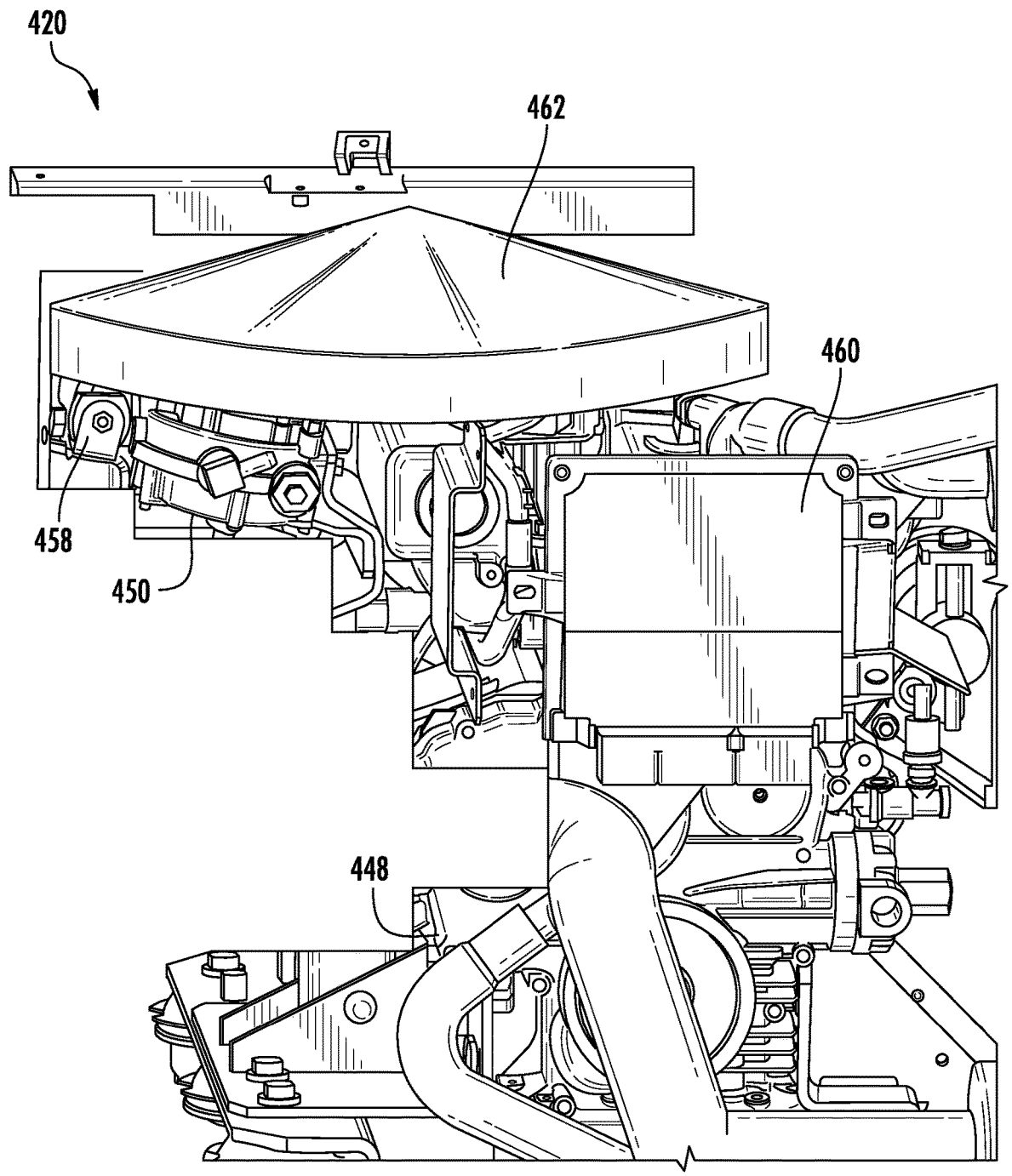
FIG. 4 is a schematic illustration of a refrigeration unit having a safety system in accordance with an embodiment of the present disclosure installed therein.

Turning now to FIG. 4, a refrigeration unit 420 configured in accordance with an embodiment of the present disclosure is shown. The refrigeration unit 420 is similar to that shown and described above and similar features will not be shown and/or discussed in detail again. The refrigeration unit 420 includes a refrigeration-unit engine 448, a safety controller 460, a regulator 450, and a lock-off valve 458. The safety controller 460 is operably connected to at least one of the lock-off valve 458 and the regulator 450.

As shown, the refrigeration unit 420 includes a guide 462 mounted or installed over or proximate to one or more methane-components of the refrigeration unit 420 (e.g., regulator 450, refrigeration-unit engine 448, and/or fuel lines as described above). In some embodiments, the guide 462 is mounted to or otherwise attached to the cover of the refrigeration unit 420. The guide 462, in some embodiments, can be a sheet metal funnel or cone, although other geometries and/or configurations are possible without departing from the scope of the present disclosure. The guide 462 is arranged to channel or otherwise direct any leaked gases, such as methane, toward a methane sensor that is positioned within the guide 462, as described below.

The methane sensor is operably connected and/or in communication with the safety controller 460. The methane sensor is configured to, at the least, provide methane concentration information to the safety controller 240. In some configurations, the methane concentration information can be an electrical signal that is triggered in the presence of methane above a predetermined concentration level. In other embodiments, the methane sensor can be more sophisticated, such as including onboard electronics that are used to generate a signal or packet that provides more and/or additional information from the methane sensor to the safety controller 460. For example, in some configurations, the methane concentration information can include a time stamp such that a historical record or tracking of methane concentrations can be obtained. Further, in some embodiments, the methane sensor can actively and/or continuously monitor for the presence and/or concentrations of various gases, including, but not limited to methane.

The guide 462 is mounted to or otherwise affixed to the cover of the refrigeration unit 420 (e.g., cover 246 in FIG. 2B). As such, in some configurations, when the cover is opened, the guide 462 will move with the cover. This can enable a mechanic or other person to access parts of the refrigeration unit 420 covered by the guide 462 without additional effort to remove the guide 462. However, in other embodiments, the guide 462 can be mounted to part of the refrigeration unit 420 and/or a housing thereof (e.g., housing 244 in FIG. 2B).

Figure 5:
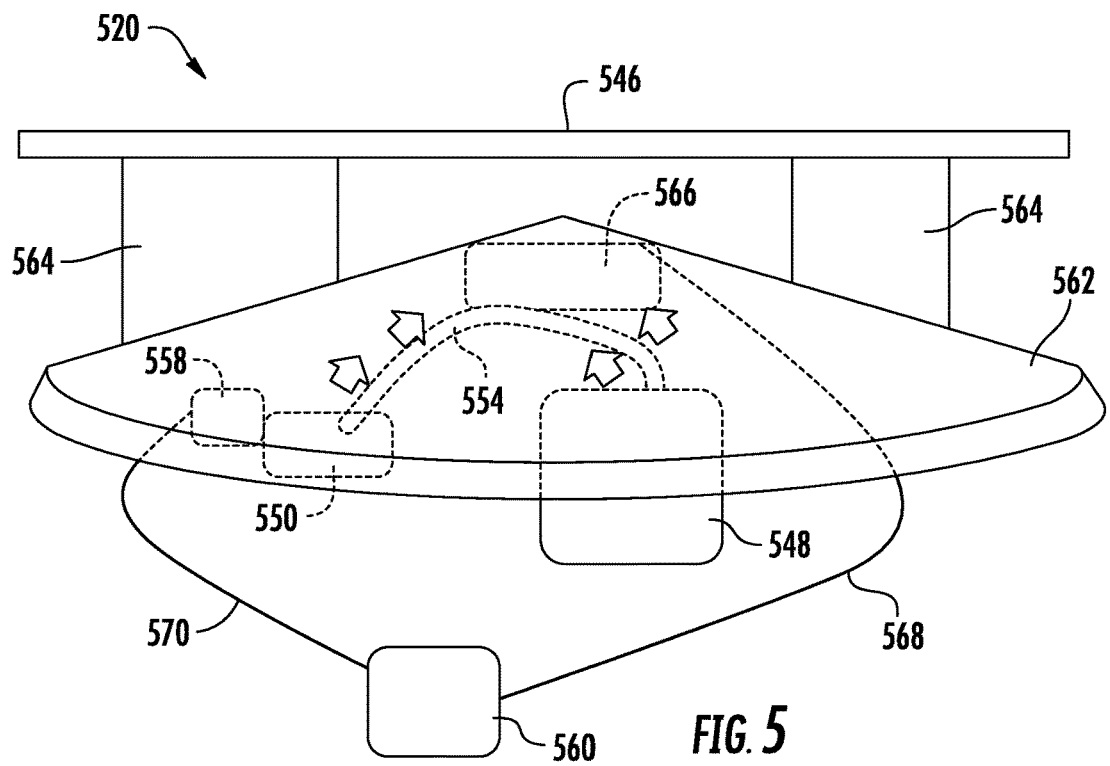
FIG. 5 is a schematic illustration of a safety system for a refrigeration unit in accordance with the present disclosure.

Turning now to FIG. 5, a schematic illustration of a refrigeration unit 520 configured in accordance with an embodiment of the present disclosure is shown. The refrigeration unit 520 includes a refrigeration-unit engine 548, such as a methane engine, a regulator 550, and a lock-off valve 558 that is operably controlled by a safety controller 560, as described above. The refrigeration unit 520 has a housing with a cover 546, similar, for example, to that shown in FIG. 2B. Suspended from the cover 546 is a guide 562 (shown in outline/transparent) similar to that shown and described above. The guide 562 is mounted to the cover 546 by one or more guide supports 564. The guide supports 564 can be fixed beams or rods, chains, cables, cords, may be hinged, or may have other construction. In some embodiments, the guide supports 564 can removably attach to the cover 546 and further, in some embodiments, the guide 562 can removably attach to the guide supports 564.

The guide 562 is positioned proximate to and/or over one or more methane-components of the refrigeration unit 520. For example, as shown in FIG. 5, the guide 562 is positioned over the refrigeration-unit engine 548, the regulator 550, and fuel lines 554 (illustratively shown fluidly connecting the regulator 550 to the refrigeration-unit engine 548).

As shown in FIG. 5, if a leak of methane occurs, the guide 562 is configured to direct and/or funnel the leaked methane toward a methane sensor 566 positioned at a peak or top of the guide 562. The methane sensor 566 is mounted to the guide 562 such that any leaked methane that occurs beneath the guide 562 will be directed toward the methane sensor 566 (as shown by the arrows beneath the guide 562). In some embodiments, the methane sensor 566 may be integrated into or part of the guide 562. The leaked methane may originate from any component that houses, contains, uses, or has methane pass therethrough, and thus the guide 562 is arranged to collect any leaked methane gas from any such methane-components.

The methane sensor 566 is in communication with the safety controller 560, in this embodiment, by a first communication line 568. The first communication line 568 is used to transmit a signal (or information) from the methane sensor 566 to the safety controller 560. The first communication line 568 can be a wired or wireless communication line that enables communication between the methane sensor 566 and the safety controller 560.

Further, the safety controller 560 is in communication with the lock-off valve 558, in this embodiment, by a second communication line 570. The second communication line 570 is used to transmit a signal (or information) from the safety controller 560 to the lock-off valve 558. The second communication line 570 can be a wired or wireless communication line that enables communication between the safety controller 560 and the lock-off valve 558. The safety controller 560 can send an actuation signal to the lock-off valve 558 to shut down or prevent methane from flowing into the methane-components, and thus stopping a leak that may be detected at the methane sensor 566. The safety controller 560 can have one or more additional communication lines that are configured to enable communication with a human, such as a mechanic and/or driver of a vehicle. For example, the safety controller 560 can be in operable communication with a light, speaker, or other indicator located within a cab of a vehicle to enable a notification to be presented to a driver in the cab that a methane leak is occurring within the refrigeration unit 520. In this way, a methane leak can be detected using a methane detection sensor located inside the refrigeration unit, above sensitive parts such as gas supply hose(s), gas regulator(s), an engine, etc.

Figure 6:
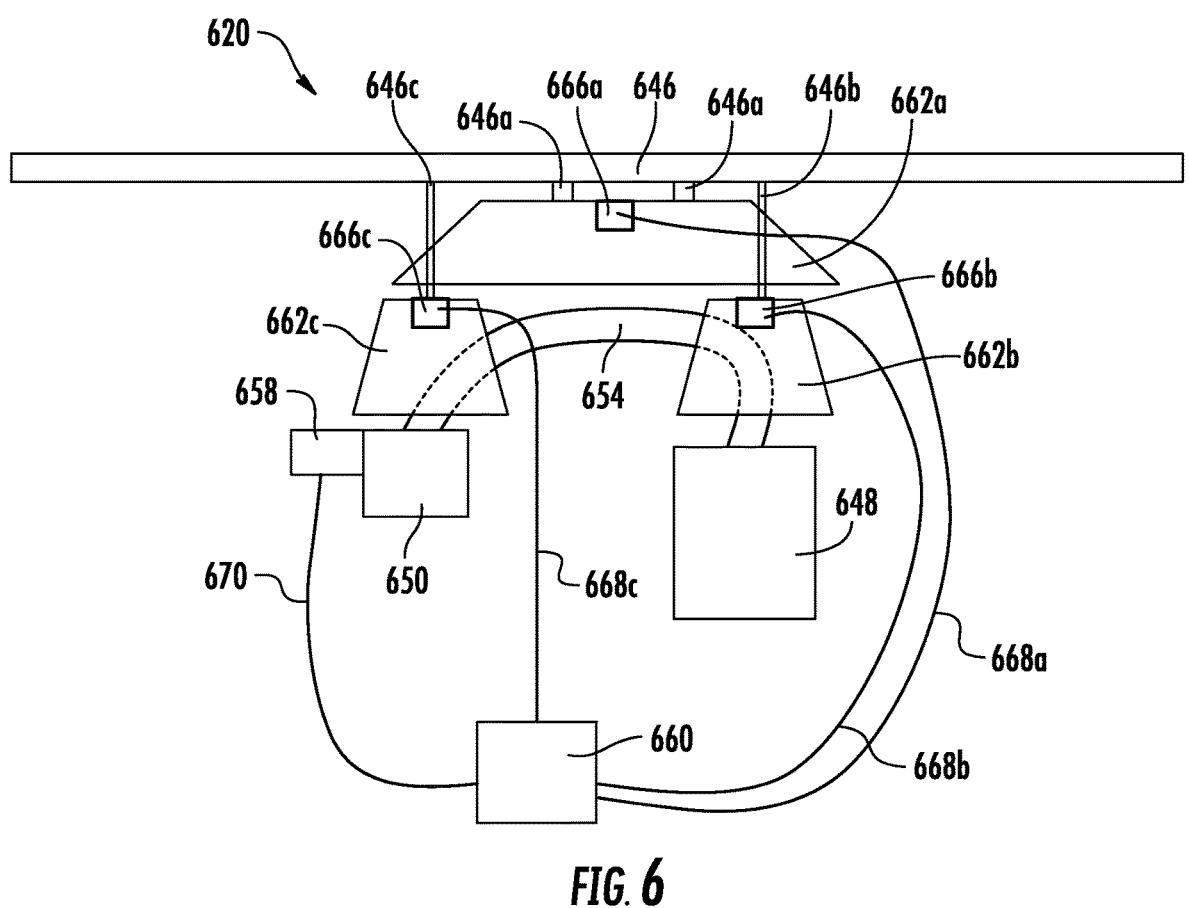
FIG. 6 is a schematic illustration of an alternative configuration of a safety system for a refrigeration unit in accordance with an embodiment of the present disclosure.

Turning now to FIG. 6, schematic illustration of a refrigeration unit 620 configured in accordance with another embodiment of the present disclosure is shown. The refrigeration unit 620 includes a refrigeration-unit engine 648, such as a methane engine, a regulator 650, and a lock-off valve 658 that is operably controlled by a safety controller 660, as described above. The refrigeration unit 620 has a housing with a cover 646, similar, for example, to that shown in FIG. 2B. Suspended from the cover 646 are multiple guides 662a, 662b, 662c (shown in outline/transparent) similar to that shown and described above. The guides 662a, 662b, 662c are mounted to the cover 646 by one or more respective guide supports 664a, 664b, 664c. The guide supports 664a, 664b, 664c can be fixed beams or rods, chains, cables, cords, may be hinged, or may have other construction. In some embodiments, the guide supports 664a, 664b, 664c can removably attach to the cover 646 and further, in some embodiments, the guides 662a, 662b, 662c can removably attach to the respective guide supports 664a, 664b, 664c.

The guides 662a, 662b, 662c illustrated in FIG. 6 are positioned proximate to and/or over one or more respective methane-components of the refrigeration unit 620. For example, as shown in FIG. 6, a first guide 662a is positioned over or proximate the fuel lines 654 (illustratively shown fluidly connecting the regulator 650 to the refrigeration-unit engine 648), a second guide is positioned over or proximate the refrigeration-unit engine 648, and a third guide 662c is positioned over or proximate the regulator 650.

Each of the guides 662a, 662b, 662c includes a respective methane sensor 666a, 666b, 666c. The methane sensors 666a, 666b, 666c can each individually be in communication with the safety controller 660 by a respective first communication line 668a, 668b, 668c, and a second communication line 670 connects the safety controller 660 to the lock-off valve 658. As noted above, the communications lines 668a, 668b, 668c, 670 can be wired or wireless communication lines, as will be appreciated by those of skill in the art. In one non-limiting example of the embodiment shown in FIG. 6, each of the methane sensors 666a, 666b, 666c can include identification information in signals or transmissions sent to the safety controller 660. The safety controller 660 can then identify the location of a methane leak, while also shutting off a methane supply to one or more of the methane-components. The identification can be used to enable efficient repairs and/or maintenance to be performed on the refrigeration unit 620.

The methane sensors of the present disclosure can take various forms as will be appreciated by those of skill in the art. In one non-limiting example, the methane sensor can react in contact of methane, i.e., methane molecules contacting a portion of the sensor. The methane sensor can have various levels of sensitivity, as may be appropriate for the particular refrigeration unit configuration. For example, a methane sensor can have a sensitivity to methane levels in concentrations from 200 to 10,000 ppm. Such a methane sensor can include a sensor layer made of tin dioxide ($SnO_2$), an inorganic compound which has lower conductivity in clean air (e.g., in the absence of methane). However, such a sensor layer can have the conductivity thereof increase as the levels of methane rise (e.g., as methane contacts the sensor layer). An electrical signal output can be transmitted to the safety controller. The safety controller, in turn, can activate or actuate the lock-off valve. As noted above, in parallel or alternatively, a warning message, indicator, siren, etc. can be trigged to alert personnel of a methane leak.

Advantageously, embodiments described herein provide a methane detection system to enable detection and preventative action to be taken within and/or for a refrigeration unit. For example, embodiments provided herein are directed to refrigeration units for transportation and/or cargo that include a methane engine and a methane sensor housed within a guide that is arranged about methane-components of the refrigeration unit. The guide can direct a flow of methane gas toward a methane sensor, which in turn can detect a concentration of methane. Upon a predetermined concentration of methane being detected at the methane sensor, a signal can be sent to a safety controller of the refrigeration unit. The safety controller can perform a safety action such as actuating or activating a lock-off valve to shut of a methane supply and/or generate an alert to notify persons that a methane leak is detected within the refrigeration unit.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A safety system for a methane-powered refrigeration unit comprising:
   a housing;
   a refrigeration engine positioned within the housing;
   a regulator positioned within the housing and fluidly connected to the engine, the regulator configured to control fuel supply to the refrigeration engine through at least one fuel line;
   a lock-off valve operably connected to the regulator and configured to shut off fuel supply through the regulator to the refrigeration engine;
   a safety controller operably connected to at least one of the lock-off valve and the regulator;
   a guide positioned within the housing and proximate to at least one of the refrigeration engine, the regulator, and the at least one fuel line, the guide arranged to direct gases leaking from the respective refrigeration engine, regulator, and at least one fuel line; and
   a methane sensor positioned within the guide and configured to detect the presence of methane within the guide that is directed by the guide, the methane sensor in communication with the safety controller and configured to transmit a signal to the safety controller when methane is detected by the methane sensor;
   wherein the safety controller performs a safety action when the signal from the methane sensor is received.

2. The safety system of claim 1, wherein the housing includes a cover and the guide is one of removably attached or fixedly attached to the cover, wherein the guide covers the refrigeration engine.

3. The safety system of claim 1, wherein the guide is positioned proximate to at least two of the refrigeration engine, the regulator, and the at least one fuel line.

4. The safety system of claim 1, wherein the guide is positioned proximate all of the refrigeration engine, the regulator, and the at least one fuel line, such that a leak from any of the refrigeration engine, the regulator, and the at least one fuel line is directed to the methane sensor.

5. The safety system of claim 1, wherein the guide is a funnel and the methane sensor is positioned at a peak or top of the funnel.

6. The safety system of claim 1, wherein the safety action includes activating the lock-off valve to shut of a fuel supply to at least one of the refrigeration engine, the regulator, and the at least one fuel line.

7. The safety system of claim 1, wherein the safety action includes generating a notification to notify a person of a methane leak.

8. The safety system of claim 1, wherein the methane sensor includes a sensor layer made of an inorganic compound that has lower conductivity in the absence of methane and a higher conductivity in the presence of methane.

9. The safety system of claim 8, wherein the sensor layer is a layer of tin dioxide.

10. The safety system of claim 1, wherein the methane sensor has a sensitivity to methane levels in concentrations from 200 to 10,000 ppm within the guide.

11. The safety system of claim 1, wherein the refrigeration unit further includes a compressor and a condenser.

12. The safety system of claim 1, wherein the guide is formed of sheet metal.

13. The safety system of claim 1, wherein the guide is positioned proximate the at least one fuel line, the guide having the methane sensor installed therein, the system further comprising:
   a second guide positioned within the housing and proximate to the refrigeration engine, the second guide arranged to direct gases leaking from the refrigeration engine;

a second methane sensor positioned within the second guide and in communication with the safety controller;

a third guide positioned within the housing and proximate to the regulator, the third guide arranged to direct gases leaking from the regulator; and a third methane sensor positioned within the third guide and in communication with the safety controller.

14. A transportation refrigeration unit comprising:

a housing;

a refrigeration engine positioned within the housing;

a regulator positioned within the housing and fluidly connected to the engine, the regulator configured to control fuel supply to the refrigeration engine through at least one fuel line;

a lock-off valve operably connected to the regulator and configured to shut off fuel supply through the regulator to the refrigeration engine;

a safety controller operably connected to at least one of the lock-off valve and the regulator;

a guide positioned within the housing and proximate to at least one of the refrigeration engine, the regulator, and the at least one fuel line, the guide arranged to direct gases leaking from the respective refrigeration engine, regulator, and at least one fuel line; and a methane sensor positioned within the guide and configured to detect the presence of methane within the guide that is directed by the guide, the methane sensor in communication with the safety controller and configured to transmit a signal to the safety controller when methane is detected by the methane sensor;

wherein the safety controller performs a safety action when the signal from the methane sensor is received.

15. A container refrigeration unit comprising:

a housing;

a refrigeration engine positioned within the housing;

a regulator positioned within the housing and fluidly connected to the engine, the regulator configured to control fuel supply to the refrigeration engine through at least one fuel line;

a lock-off valve operably connected to the regulator and configured to shut off fuel supply through the regulator to the refrigeration engine;

a safety controller operably connected to at least one of the lock-off valve and the regulator;

a guide positioned within the housing and proximate to at least one of the refrigeration engine, the regulator, and the at least one fuel line, the guide arranged to direct gases leaking from the respective refrigeration engine, regulator, and at least one fuel line; and a methane sensor positioned within the guide and configured to detect the presence of methane within the guide that is directed by the guide, the methane sensor in communication with the safety controller and configured to transmit a signal to the safety controller when methane is detected by the methane sensor;

wherein the safety controller performs a safety action when the signal from the methane sensor is received.

16. The container refrigeration unit of claim 15, wherein the guide is positioned proximate the at least one fuel line, the guide having the methane sensor installed therein, the system further comprising:

a second guide positioned within the housing and proximate to the refrigeration engine, the second guide arranged to direct gases leaking from the refrigeration engine;

a second methane sensor positioned within the second guide and in communication with the safety controller;

a third guide positioned within the housing and proximate to the regulator, the third guide arranged to direct gases leaking from the regulator; and a third methane sensor positioned within the third guide and in communication with the safety controller.

17. The container refrigeration unit of claim 15, wherein the methane sensor includes a sensor layer made of an inorganic compound that has lower conductivity in the absence of methane and a higher conductivity in the presence of methane.

18. The transportation refrigeration unit of claim 14, wherein the guide is positioned proximate the at least one fuel line, the guide having the methane sensor installed therein, the system further comprising:

a second guide positioned within the housing and proximate to the refrigeration engine, the second guide arranged to direct gases leaking from the refrigeration engine;

a second methane sensor positioned within the second guide and in communication with the safety controller;

a third guide positioned within the housing and proximate to the regulator, the third guide arranged to direct gases leaking from the regulator; and a third methane sensor positioned within the third guide and in communication with the safety controller.

19. The transportation refrigeration unit of claim 14, wherein the methane sensor includes a sensor layer made of an inorganic compound that has lower conductivity in the absence of methane and a higher conductivity in the presence of methane.

* * * * *